United States Patent [19]

Brett

[11] Patent Number: 5,159,160
[45] Date of Patent: Oct. 27, 1992

[54] DOWNHOLE SEISMIC ENERGY SOURCE

[75] Inventor: James F. Brett, Tulsa, Okla.

[73] Assignee: Oil & Gas Consultants International Inc., Tulsa, Okla.

[21] Appl. No.: 704,805

[22] Filed: May 23, 1991

[51] Int. Cl.⁵ .............................................. G01V 1/40
[52] U.S. Cl. .................................. 181/106; 181/113; 181/121
[58] Field of Search ............... 181/106, 113, 121, 108; 73/151

[56]  References Cited
U.S. PATENT DOCUMENTS

| | | | |
|---|---|---|---|
| 3,718,205 | 2/1973 | Fair et al. | 181/5 H |
| 4,252,210 | 2/1981 | Sodich | 181/119 |
| 4,671,379 | 6/1987 | Kennedy et al. | 181/401 |
| 4,702,343 | 10/1987 | Paulsson | 181/106 |
| 4,722,417 | 2/1988 | Selsam | 181/119 |
| 4,783,771 | 11/1988 | Paulsson | 367/57 |
| 4,796,723 | 1/1989 | Laurent et al. | 181/102 |
| 4,805,725 | 2/1989 | Paulsson | 181/106 |
| 4,805,727 | 2/1989 | Hardee et al. | 181/106 |
| 4,815,557 | 3/1989 | Duwe | 181/106 |
| 4,834,210 | 5/1989 | Kennedy | 181/106 |
| 4,856,614 | 8/1989 | Arens et al. | 181/104 |
| 4,954,998 | 9/1990 | Rector | 367/82 |

*Primary Examiner*—J. Woodrow Eldred
*Attorney, Agent, or Firm*—Head & Johnson

[57] ABSTRACT

A downhole seismic energy source for use in generating a seismic signal in a borehole including an elongated mass having a generally cylindrical surface of diameter less than the borehole, an actuator suspending the cylindrical mass in the borehole wherein the cylindrical surface thereof is in frictional contact with the borehole wall, the cylindrical mass being rotatable about its rotational axis to cause the mass to whirl within the borehole in the direction opposite the direction of the rotation of the mass, the mass cylindrical force serving to create a seismic energy signal.

20 Claims, 3 Drawing Sheets

DOWNHOLE SEISMIC ENERGY SOURCE

BACKGROUND OF THE INVENTION

The invention disclosed herein has the purpose of providing a powerful and controllable downhole seismic source that can function in either a cased or an open borehole. One of the problems with many previous downhole seismic energy sources has been their limited power. A seismic energy source with more power will allow fewer measurements to be taken to seismically characterize the subsurface, saving time and money. In circumstances where oil or gas well spacing is large, greater seismic energy power means greater range. The improved downhole seismic energy source of this disclosure will allow investigation of subterranean structure between wells that cannot be accomplished with presently available downhole seismic energy sources.

It is important that seismic energy be generated at a known and controllable frequency. The most powerful seismic energy sources currently available are limited in use to only cased holes. This limitation can make it difficult and expensive to use well borehole to well borehole seismic surveys in open boreholes. For these and other reasons, a more powerful and yet controllable downhole seismic sources that can be used in either a cased or an open borehole is needed.

For information relating to others who have provided methods and apparatuses for generating downhole seismic energy, reference may be had to the following previously issued U.S. Pat. Nos. 3,718,205; 4,252,210; 4,671,379; 4,702,343; 4,722,417; 4,783,771; 4,796,723; 4,805,725; 4,805,727; 4,815,557; 4,834,210 and 4,856,614.

SUMMARY OF THE INVENTION

Basically, the downhole seismic energy source of this disclosure is a cylindrical mass that is caused to backward whirl about a borehole. Backward whirling motion is identical to the motion of a pinion rotating in an internal gear or that of a "spiro-graph" child's toy. One salient feature of the motion is that it creates very large centrifugal accelerations that allow a relatively small mass to create a very large force. For example, a 4.5" diameter steel mass 10' long, inside 5" ID casing will create about 24,000 pounds of sinusoidally varying force at 41.7 Hz when made to backward whirl by rotation at 250 RPM.

In the seismic energy source of this disclosure the power necessary to drive the backward whirling motion is provided by either a mechanical linkage to the surface, i.e. a string of tubing or dill pipe, or by a downhole motor, either electric, hydraulic or pneumatic. An electric motor offers the advantage of being finely speed controllable from the surface, but its power is limited by size constraints dictated by the borehole size. A hydraulic motor, on the other hand, can deliver 5 to 10 times more power per unit volume than an electric motor.

Systems required to maintain controllable rotational speed for electric or mechanical drive systems are well known in the art. A system to measure the frequency of the backward whirling seismic source used in combination with a downhole hydraulic motor is provided. To determine the position, velocity, or acceleration of the seismic source, an accelerometer can be placed on the motor near the cylindrical mass. This allows the drive frequency of the seismic source to be known through either electronic recording means downhole, or by transmission to the surface by mud telemetry, or via an electric conductor. This signal can then be used to control the speed of the driving motor, and thus the frequency of the seismic source.

Control of a driving motor can be accomplished in a number of ways. The surface pumping rate of a positive displacement pump can be controlled to vary the pumping rate in response to the desired range of frequencies of the seismic source, which may be either constant or varying with time. A positive displacement pump can control the speed of a positive displacement downhole motor in proportion to the pump's speed. It is also possible to use a turbine or other type of downhole motor to drive the whirling cylindrical mass.

Even in cases where a positive displacement downhole motor is used as the drive source, it is possible that compressibility of the circulating fluid, uncertainties in the actual diameter of the borehole, leakage in the motor or pump, and pressure expansion effects in the tubing may prevent adequate control. In that case, a portion of the circulating medium can be shunted past the motor to provide a way to control the excitation frequency of the whirling cylindrical mass. The pump at the surface is controlled to provide a greater flow than necessary to achieve the desired excitation frequency, and this flow may change with time. The measured excitation frequency is then compared with a desired value. The measured frequency can either be transmitted from the surface or produced by downhole electronic systems, as is well known in the art. The downhole shunt valve is then operated to port fluid away from the positive displacement motor so as to maintain the measured excitation rate at the desired level. The downhole shunt valve may throttle fluid at the desired level. The downhole shunt valve may throttle fluid (i.e. act as a proportional control valve) or it may act in a fully opened or fully closed manner and to control the amount of fluid shunted past the motor by duty cycle modulation.

The outer surface of the whirling cylindrical mass can be controlled to create a high friction between the mass and either the borehole wall or the inside of a cased hole to promote development of the whirling motion. In a cased hole a high friction surface can be rubber with a tread that reduces any slipping tendencies due to fluid in the well. In an open hole operation the surface may have steel ribs, studs or such, in a rubber matrix to promote high friction between the side of the borehole and the whirling cylindrical mass.

The motor may be hung in the borehole with "slip" type elements so as to isolate the accelerations experienced by the whirling mass from the tubing string, in which case the use of a U-joint or flexible coupling is necessary. Such a hanging system can also be used in conjunction with the driver power being transmitted from the surface by the tubing string. In this case the hanging system can have a gearing system to change the rotational speed of the drive string to a speed that is optimum to drive the whirling cylindrical mass.

A "starter spring" system can be used to ensure that the whirling cylindrical mass is in contact with the borehole or the sidewall of a casing. A starter system ensures that a self-regenerative whirling motion begins in every circumstance. Basically, the starter system biases the position of the cylindrical mass to one side of the borehole or casing so that contact is ensured to allow an initial force to be created between the mass and the borehole wall. After rotation is initiated the regenerative nature of backward whirling motion ensures that frictional contact is continued. The starter system can be constructed to be retracted when whirling motion is started.

In one embodiment of the concept, the whirling cylindrical mass is never actually in contact with the borehole or casing. In this embodiment, the whirling mass acts as a pinion and the "contact" gear is an internal gear that is anchored in the open borehole or casing by means of "slips" or other systems. This embodiment has the advantages of eliminating the need to create friction between the whirling cylindrical mass and the borehole wall, ensures a known diameter of whirl, and also provides greater contact area so that less stress is placed on the borehole.

The downhole seismic energy source of this disclosure is different than an eccentric mass in several important ways. First, an eccentric mass must be rotated at its excitation frequency. This means that high speed motors are required to achieve practical excitation frequencies. With the whirling cylindrical mass of this disclosure, however, the physics of whirling itself magnifies the frequency of excitation. This means that lower speed downhole motors can be used as a power source. Second, an excitation force of an eccentric mass must be transmitted through some kind of drive shaft. This means that the forces possible are limited due to physical stress limits in practical sized drive shafts. With a whirling cylindrical mass, however, the excitation force is supported by the borehole itself. This means that much greater excitation forces are possible.

A better understanding of the invention may be obtained with reference to the following description and drawings, taken in conjunction with the attached views.

DESCRIPTION OF THE PREFERRED EMBODIMENTS

Figure 1:
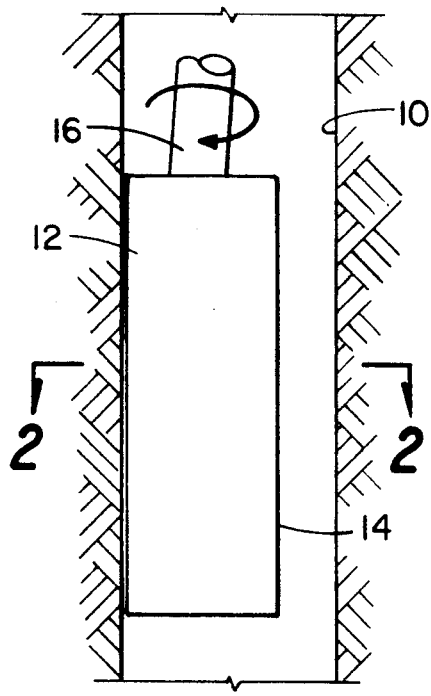
FIG. 1 is a basic view of the apparatus for practicing the principles of this invention in the form of a cylindrical mass rotated in a borehole, the mass being in contact with the borehole so that as it is rotated, the mass migrates in the direction opposite of rotation around the borehole to create large centrifugal forces.

Referring to FIG. 1, the basic concept of this invention is illustrated diagrammatically and is illustrated for use in an open borehole. The concept of FIG. 1 can also be used in a cased borehole. A borehole 10 extends from the earth's surface, as drilled in the usual manner for drilling oil or gas wells. The object of the present invention is to generate a seismic energy signal, that is, to generate pressure wave signals that travel in the earth and that can be detected by geophones placed on the earth or in adjacent boreholes. Through the science of seismology the detected seismic waves can be analyzed to provide geologists with important information concerning the structure through which borehole 10 traverses and the structure surrounding the borehole.

Positioned within the borehole is an elongated cylindrical mass 12 having an external cylindrical or nearly cylindrical surface 14. The external surface 14 could be rough or have ribs or other non-cylindrical features. The mass is rotated by a rotational means 16 in a manner to be described subsequently. Cylindrical surface 14 is in contact with borehole wall 10.

Figure 2:
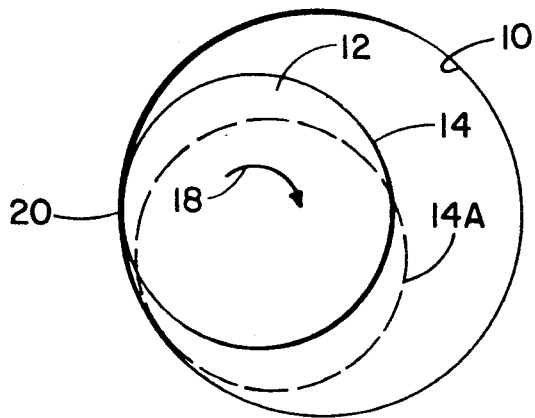
FIG. 2 is a cross-sectional view taken along the line 2—2 of FIG. 1 showing the cylindrical mass in cross-section and illustrating how the mass whirls within the borehole to create centrifugal force.

FIG. 2, a cross-sectional view of FIG. 1, illustrates the concept of this disclosure. Assuming cylindrical mass 12 is rotated clockwise in the direction indicated by arrow 18, the mass, due to frictional contact with the borehole wall, will migrate or "backward whirl" in a counterclockwise direction, that is, the direction opposite of that of arrow 18. After an incremental time the mass will take the position as indicated by 14A. The mass will continue to rotate in a counterclockwise direction, whirling around the interior of borehole 10.

Assuming no slip at the contact point 20 between external surface 14 of the cylindrical mass and borehole wall 10, the whirling mass will contact each point on the borehole wall, such as at point 20 at a frequency rate according to the formula:

$$f = \frac{D}{P}(RPM)\frac{1}{60}$$

Where "f" is the excitation frequency in Hz;
Where "Dw" is the diameter of borehole 10;
Where "RPM" is rotations per minute;
Where "P" is the difference in the diameter of the borehole 10 and the diameter of the cylindrical mass 12 (P=Dw−D);
Where "D" is the diameter of the cylindrical mass 12.

As an example, if cylindrical mass 12 has a diameter of 4.5 inches and borehole 10 has a diameter of 5 inches or, instead, if the borehole is the interior of a casing, a sinusoidal varying force at 37.5 Hz will be created by the backward whirl of the cylindrical mass when it is rotated at 250 RPM.

The contact force of cylindrical mass 12 against each point of contact with borehole wall 10 is expressed according to the formula:

$$Fc = (.0000141)D^2 \frac{RPM^2}{P} (W)$$

Where "Fc" is the force of contact;
Where "W" is the weight of the cylindrical mass.

The centrifugal acceleration in "g's" of the whirling mass is determined by the formula:

$$.0000141 \frac{D^2 RPM^2}{P}$$

If in the example given above wherein cylindrical mass 12 is 4.5 inches in diameter and is formed of steel and is 10 feet long, and with a diameter of borehole 10 equaling 5 inches, at 250 RPM the whirling mass would create about 19,440 pounds of sinusoidal varying force at 37.5 Hz.

Figure 3:
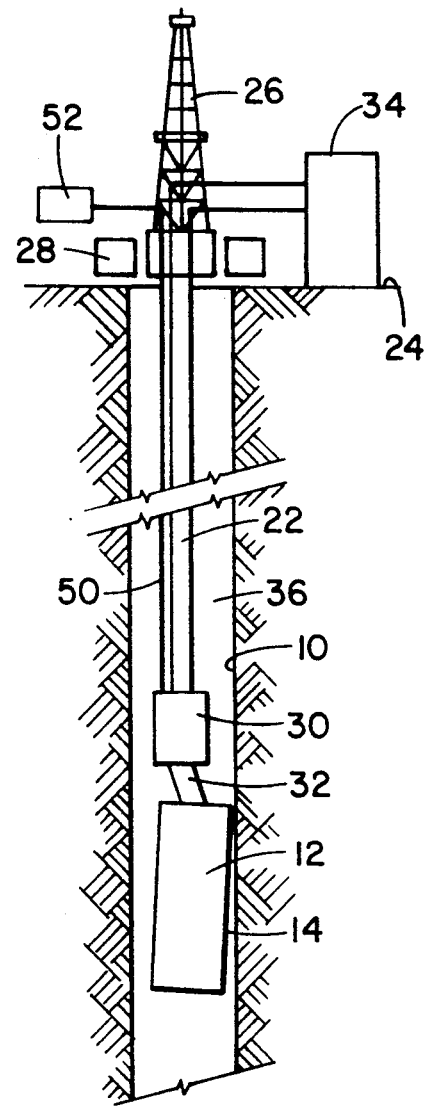
FIG. 3 is a diagrammatic elevational view of a borehole extending from the earth's surface showing an apparatus for use in applying rotational energy to the cylindrical mass.

FIG. 3 shows more details of the typical application of the concepts of FIGS. 1 and 2. Positioned within borehole 10 is a tubing string 22 extending from the earth's surface 24 and suspended by a surface system 26 of the type typically employed for drilling or working over an oil or gas well. The surface system 26 may include a source of rotary energy 28 of the type such as used for rotating a drill string during drilling operations which may be adapted to be rotated at higher speeds. By rotating tubing 22 cylindrical mass 12 can be rotated to generate a seismic energy signal in the method as previously described.

Figure 4:
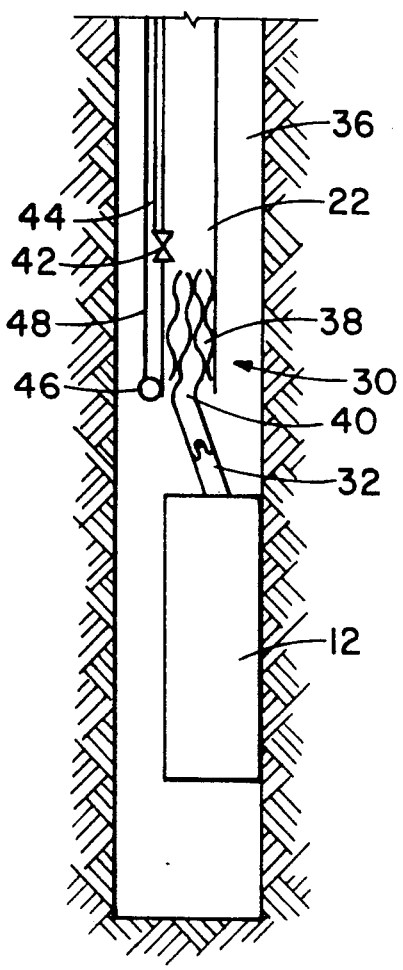
FIG. 4 is another elevational diagrammatic view of the subsurface portion of the borehole showing a type of positive displacement downhole pump that may be used for applying rotational energy to a centrifugal mass.

Instead of rotating tubing string 22 a rotary power source 30 may be suspended by the tubing string and connected to cylindrical mass 12, such as by means of a coupling member 32. The rotary power source 30 may be an electric power, either DC or AC, or a downhole hydraulic motor. When the rotary power source is a downhole hydraulic motor, a source of hydraulic power 34 is provided at the earth's surface and connected to tubing string 22 by which fluid under pressure is forced downwardly through the tubing to the rotary power source 30. The fluid passes out of the rotary power source and into the well annular area 36 and back to the earth's surface. FIG. 4 shows one means of providing a rotary power source 30 of the hydraulic type. In this type, the rotary power source is a positive displacement downhole motor 38 affixed to tubing string 22. The motor 38 has a shaft 40 connected to coupling member 32 that may be in the form of a flexible coupling or universal joint by which the rotary energy from positive displacement motor 38 is coupled to cylindrical mass 12.

As fluid is forced down the interior of tubing string 22, it passes through the positive displacement motor 38, causing shaft 40 to rotate, the fluid returning in the annular area 36 back to the earth'surface. In some applications it may be important to control the RPM of the whirling cylindrical mass 12 so as to control the frequency of the seismic energy signal being generated. This can be accomplished in a variety of ways. In one way as illustrated in FIG. 4, a shunt bypass valve 42 is positioned in communication with the interior of tubing string 22 above the rotary power source 30. By means of a conductor 44 extending to the earth's surface, electrical signals may be applied to shunt bypass valve 42 to control the opening and closing of the valve. When valve 42 is opened, or partially opened, some of the hydraulic fluid flowing downwardly through tubing string 22 is diverted directly into the well annulus 36 and therefore does not flow through positive displacement motor 38. Therefore, it can be seen that by bypassing a portion of the fluid flow the rotary force generated by positive displacement motor 38 can be altered, to thereby alter the RPM of rotation of cylindrical mass 12.

Another way of controlling the RPM of cylindrical mass 12 when rotated by a positive displacement motor, as illustrated in FIG. 4, is by controlling at the earth's surface the rate of fluid output of the hydraulic power source 34, as shown in FIG. 3. Thus, in summary, the rate of rotation of cylindrical mass 12 and therefore the frequency of the seismic energy signal can, when the power source is hydraulically actuated, be controlled by means at the earth's surface or downhole to achieve the desired frequency of the seismic energy signal.

To determine the frequency of the seismic signal generated by the whirling cylindrical mass 12 an accelerometer 46, or other frequency sensing device, may be affixed to the lower end of the tubing string or on the whirling mass. By a conductor 48 extending to the earth's surface a signal can be delivered to indicate to operators at the earth's surface the frequency of the signal so as to be able to control the frequency to obtain that which is desired.

Referring back to FIG. 3, as previously stated, rotary power source 30 may be an electric motor supplied by electric energy over cable 50 extending to the earth's surface and connected to a source of electrical power 52.

Figure 5:
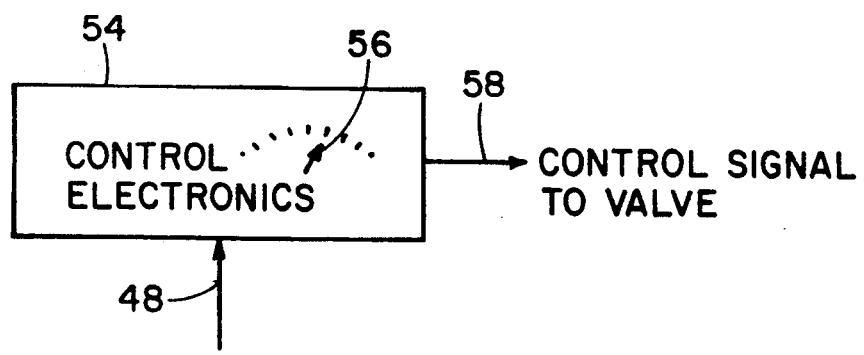
FIG. 5 is rudimentary diagram of means for controlling the rate of rotation of a centrifugal mass so as to produce seismic energy signals having a desired frequency characteristic.

As referenced in FIG. 4, the measured frequency of the seismic signal generated by whirling cylindrical mass 12 can be detected by accelerometer 46. FIG. 5 shows a means of using such detected measurement to attain the desired frequency of the seismic energy signal. The measured signal appears on cable 48 as previously described. This signal is fed to control electronics 54 having a frequency selector 56 input by which the desired frequency of the required seismic signal is selected. The selected frequencies could change with time. The control electronics 54 compares the desired frequencies selected at 56 with the detected frequency appearing on conductor 48 and generates an output signal at 58 that can be connected, such as to conductor 44, to control shunt valve 42. Alternatively, output signal 48 can be used to control the source of hydraulic power 34 as shown in FIG. 3. Where rotary power source 30 is electrically operated, control signal 58 may be used to control either the voltage, if the rotary power source is a DC motor, or the frequency of the power signal if the rotary power source is a AC motor.

Figure 6:
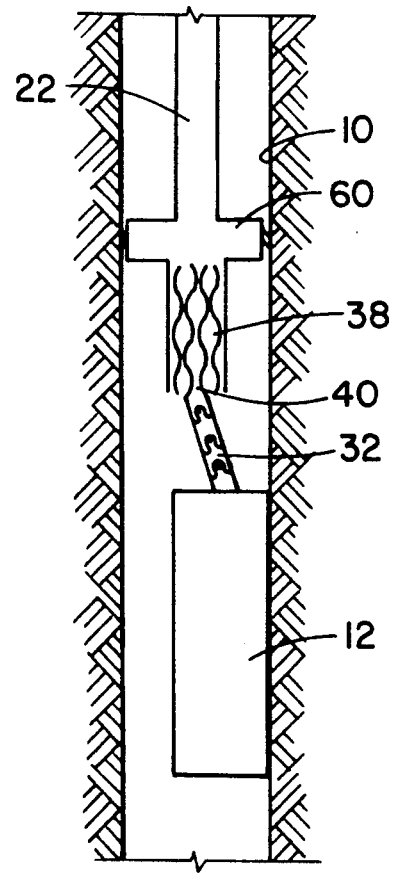
FIG. 6 is an elevational view of the downhole portion of a borehole showing diagrammatically the use of a borehole anchoring means for anchoring the motor used for rotationally driving the cylindrical mass.

With tubing string 22 suspended in a borehole or a casing as shown in FIG. 3, and with a rotary power source 30 at the lower end of tubing string it can be seen that the tubing string would be subject to substantial vibration as power is applied to rotate cylindrical mass 12. An alternate arrangement is illustrated in FIG. 6 which shows a lower end portion of borehole 10 with tubing string 22 extending from the earth's surface. Positioned at the lower end of tubing string 22 is a borehole anchor means 60. This may be in the form of slips or a hydraulic mechanism as is commonly employed in the oil and gas well drilling industry. The rotary power source, such as positive displacement motor 38, is supported below borehole anchor means 60. Flexible coupling member 32 extends from the positive displacement motor shaft 40 to connect to the whirling cylindrical mass 12. Thus, the borehole anchor means serves to anchor the lower end of tubing string 22 to prevent undue vibration of the tubing string as the whirling cylindrical mass 12 is rotated. It is also possible to have motor 38 positioned above anchor means 60 with shaft 40 extending through the anchor means to connect to flexible coupling member 32.

Figure 7:
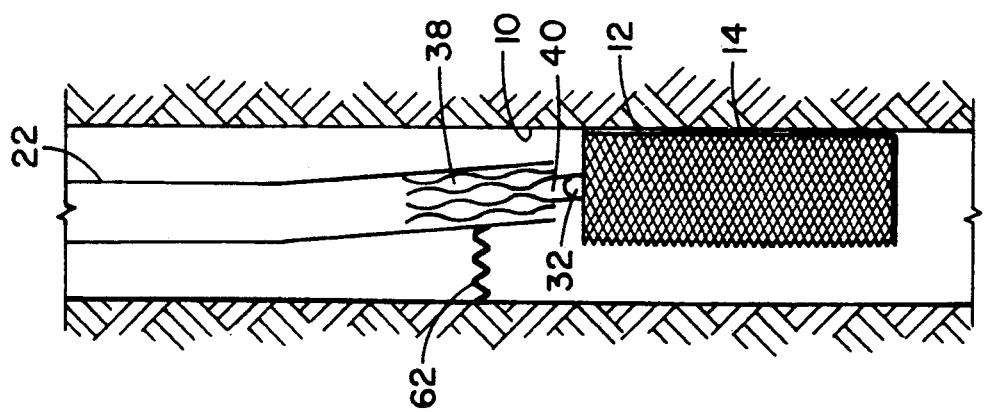
FIG. 7 is a diagrammatic view of a downhole mechanism for practicing the invention showing a spring bias means for urging the cylindrical mass into frictional contact with the borehole sidewall so that, when the mass is rotated, it will migrate in a whirling motion within the borehole.

In order for the whirling cylindrical mass 12 to rotate within the borehole or casing, cylindrical surface 14 must be in frictional contact with borehole wall 10, or the wall of the casing if operated within a casing. It can be seen that if the cylindrical mass is merely rotated within a borehole, no frictional contact is established between the rotating mass cylindrical surface and the interior of the borehole, that is, the mass will not whirl within the borehole to create a seismic source. For this reason, as illustrated in FIG. 7, a biasing force, exemplified by a bias spring 62, may be employed. The function of bias spring 62 is merely to hold cylindrical mass 12 so that cylindrical surface 14 is in frictional contact with borehole wall 10. In this matter, when rotary energy is applied to cylindrical mass 12 it will migrate in a direction opposite of its direction of rotation around borehole wall 10. Once the whirling migration is initiated the centrifugal force applied by the rotating cylindrical mass is such as to sustain the frictional engagement of the cylindrical mass with the wall. The only time the biasing force, as exemplified by biasing spring 62, is required is at the initiation of the rotation of the cylindrical mass to make sure that it is in frictional contact with borehole 10 and once the rotation is initiated, biasing spring 62 is no longer required.

In order to increase the frictional contact of the whirling mass 12 with borehole 10, the whirling mass cylindrical surface 14A may be roughed, ribbed or otherwise provided with a pattern, such as protruding diamond shaped projections as shown in FIG. 7. This arrangement reduces slippage between the surface of whirling mass and the borehole so that the backward whirl of the mass occurs at a more predictable rotational rate.

Figure 8:
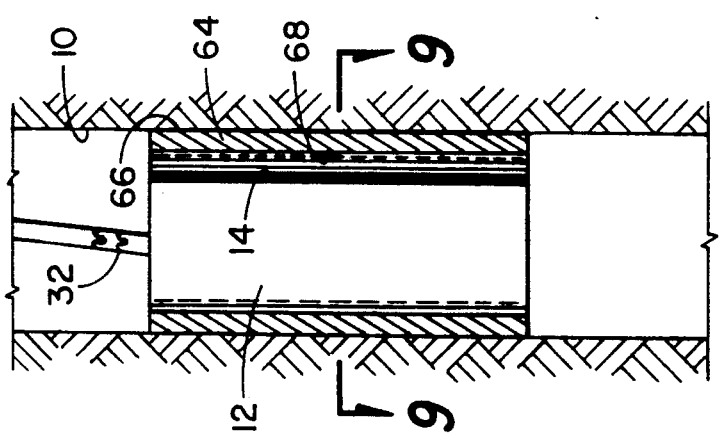
FIG. 8 is a diagrammatic view of the subsurface portion of a borehole showing a cylindrical mass positioned within the borehole and showing mounted in the borehole a tubular base member against which the cylindrical mass rotates, the tubular base member having an internal cylindrical surface arranged to provide improved frictional engagement between it and the cylindrical mass sidewall.

Another means to increase the frictional engagement of rotating cylindrical mass 12 with the interior of the borehole and thereby provide a more certain whirling diameter is illustrated in FIG. 8 which shows the employment of a tubular base member 64. The external cylindrical surface 66 of the tubular base member fits in close contact with borehole 10. Tubular base member 64 may include a wall anchor system that may be hydraulically or mechanically actuated, such as to anchor the tubular base member to borehole 10. The tubular base member 64 may be made of hard rubber, polyurethane or other material that provides an interior cylindrical surface 68 having a high co-efficient of friction surface. With tubular base member 64 properly positioned within borehole 10, cylindrical mass 12 will whirl with less slippage as it is rotated.

While tubular base member 64 may be a smooth high friction interior surface 68 an alternate arrangement, as illustrated, includes the provision wherein the tubular base member includes a tubular contact gear member 70 having teeth 72 on the interior cylindrical surface. The exterior cylindrical surface 14 of cylindrical mass 12 is likewise provided with teeth 74 that mesh with the teeth 72 on the tubular contact gear member.

Figure 9:
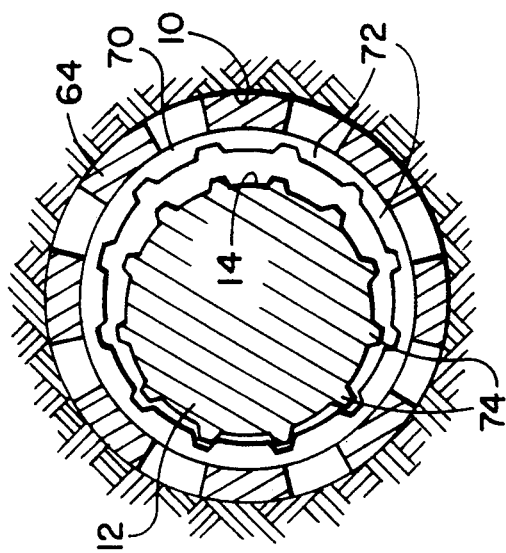
FIG. 9 is a cross-sectional view as taken along the line 9—9 of FIG. 8 showing the arrangement wherein the tubular base member has internal teeth therein and wherein the cylindrical mass has externally extending teeth, the teeth meshing so that the cylindrical mass is rotated as it whirls within the tubular base member in a gear-like arrangement.

In the embodiment of FIG. 9, the rotation of cylindrical mass 12 will take place as teeth 74 mesh with teeth 72 on the tubular contact gear member 70 so that no slippage of the cylindrical mass relative to the borehole can occur.

Tubular base member 64 may include a wall anchor system that may be hydraulically actuated, such as to anchor the tubular base member to borehole wall 10.

Thus, the system of this invention provides a relatively inexpensive means of achieving a high intensity seismic energy signal in an open borehole. The high energy is achieved since the borehole itself, or if operated within a casing the casing itself, forms an integral part of the energy system. That is, the whirling cylindrical mass transfers energy into the earth via the tubular base 64 so that maximum energy transfer of the seismic signal is obtained without the possibility of damaging the integrity of the well borehole.

The claims and the specification described the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meansing is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A downhole seismic energy source for use in generating a seismic signal in a borehole having a generally cylindrical wall, comprising:
   a mass having a surface of a dimension less than the borehole and having a rotational axis;
   means to suspend said mass in a borehole in an arrangement wherein its said surface is in frictional contact with the borehole wall; and
   means to rotate said mass about its said rotational axis in a selected direction of rotation to cause said mass to backward whirl in the opposite direction within the borehole, the whirling mass centrifugal force serving to create a seismic energy signal.

2. A downhole seismic energy source according to claim 1 wherein said means to suspend said mass in a borehole includes tubular means extending from the earth's surface.

3. A downhole seismic energy source according to claim 2 wherein said means to rotate said mass includes means interposed between said tubular means and said mass.

4. A downhole seismic energy source according to claim 3 wherein said means interposed between said tubular means and said mass is a hydraulic motor means driven by flow of fluid down through said tubular means.

5. A downhole seismic energy source according to claim 3 wherein said means interposed between said tubular means and said mass is an electric motor.

6. A downhole seismic energy source according to claim 1 including:
resilient biasing means interposed between said means to rotate said mass and said borehole to resiliently maintain said mass surface in frictional contact with said borehole.

7. A downhole seismic energy source according to claim 1 wherein the borehole within which seismic energy is generated is the interior of casing extending from the earth's surface.

8. A downhole seismic energy source according to claim 4 including means to control the speed of rotation of said mass.

9. A downhole seismic energy source according to claim 8 wherein said means to control the speed of rotation of said mass includes a controllable speed fluid pump at the earth's surface by which the rate of said fluid flow down through said tubular means is controllably variable.

10. A downhole seismic energy source according to claim 8 wherein said means to control the speed of rotation of said mass includes controllable fluid bypass means in communication with said tubular means above said hydraulic motor means.

11. A downhole seismic energy source according to claim 10 wherein said fluid bypass means is controllable from the earth's surface.

12. A downhole seismic energy source according to claim 1 wherein said mass surface is irregular to thereby increase said frictional contact with the borehole.

13. A downhole seismic energy source according to claim 12 wherein said electric motor is speed controllable.

14. A downhole seismic energy source according to claim 13 wherein said electric motor is speed controllable from the earth's surface.

15. A downhole seismic energy source according to claim 1 including means supported downhole for determining the frequency of the seismic energy generated by the rotation of said mass.

16. A downhole seismic energy source according to claim 15 wherein said means for determining the frequency of the seismic energy signal generated by the rotation of said mass is an accelerometer.

17. A downhole seismic energy source according to claim 1 including:
a tubular base means positionable and anchorable within the borehole having an internal cylindrical surface, said mass being rotated within said tubular base, said mass being cylindrical about said rotational axis and having an external cylindrical surface, the cylindrical mass and the base internal cylindrical surface having high friction therebetween.

18. A downhole seismic energy source according to claim 17 wherein said tubular base has gear teeth on said internal cylindrical surface and said cylindrical mass has mating but fewer numbered teeth on said external cylindrical surface.

19. A downhole seismic energy source according to claim 1 including borehole anchoring means for gripping a borehole cylindrical wall, said means to rotate said mass being supported by said anchor means.

20. A downhole seismic energy source according to claim 19 including
flexible coupling means between said means to rotate and said mass.

* * * * *

UNITED STATES PATENT AND TRADEMARK OFFICE
CERTIFICATE OF CORRECTION

PATENT NO. : 5,159,160
DATED : October 27, 1992
INVENTOR(S) : James F. Brett It is certified that error appears in the above—identified patent and that said Letters Patent is hereby corrected as shown below:

```
Column 1, line 46, change "24,000" to --19,440--.
Column 1, line 47, change "41.7" to --37.5--.
```

Signed and Sealed this

Thirtieth Day of May, 1995

*Attest:*

BRUCE LEHMAN

*Attesting Officer*   *Commissioner of Patents and Trademarks*